United States Patent [19]

Drudge

[11] 4,027,893
[45] June 7, 1977

[54] FORCE ABSORBING HITCH FOR A VEHICLE

[76] Inventor: Forrest R. Drudge, 1201 Begonia St., SE., DeMotte, Ind. 46310

[22] Filed: Oct. 31, 1975

[21] Appl. No.: 627,616

[52] U.S. Cl. .............................. 280/487; 267/138
[51] Int. Cl.[2] ....................... F16G 7/10; B60D 1/16
[58] Field of Search .......... 280/483, 484, 485, 486, 280/487; 267/138, 152, 153, 150

[56] References Cited

UNITED STATES PATENTS

| | | | |
|---|---|---|---|
| 1,610,180 | 12/1926 | Thomson | 280/486 |
| 1,866,796 | 7/1932 | Breuss | 280/487 |
| 1,884,323 | 10/1932 | Snow | 280/487 |
| 2,357,611 | 9/1944 | Shields | 267/138 X |
| 2,827,307 | 3/1958 | Osborn | 280/415 A |
| 3,819,206 | 6/1974 | Aarons | 267/138 X |
| 3,868,098 | 2/1975 | Coombs | 280/487 X |

*Primary Examiner*—Joseph F. Peters, Jr.
*Assistant Examiner*—R. Schrecengost
*Attorney, Agent, or Firm*—John R. Nesbitt

[57] ABSTRACT

A force absorbing hitch for a vehicle is disclosed. The hitch is capable of at least partially absorbing external forces exerted on the hitch as would be common with the hitch attached to a vehicle for towing of a trailer or the like, particularly those encountered due to acceleration or deacceleration of the towing vehicle. The hitch includes a hitch plate upon which a hitch ball can be mounted with the hitch plate having a pair of rods extending from one edge through apertures in a pair of spaced walls of a frame attached to the rear of the vehicle. Between the walls a stop plate is fastened to the rods and springs surrounding the rods are located at each side of the stop plate on both rods. The frame can be elongated to serve as a bumper or bumper extension with the hitch centrally located on the bumper and below a recess, or step, in the bumper behind which a license plate can be mounted, if desired.

7 Claims, 4 Drawing Figures

FORCE ABSORBING HITCH FOR A VEHICLE

FIELD OF THE INVENTION

This invention relates to a hitch for a vehicle and, more particularly, relates to a force absorbing hitch.

BACKGROUND OF THE INVENTION

The use of hitches whereby a towing vehicle can pull a following trailer or the like is well known and many types of such hitches have heretofore been suggested and/or utilized. One of the better known of such hitches utilizes a ball mounted behind the rear bumper of a towing vehicle so that a mating cup on the tongue of a trailer can be readily releasably attached thereto to allow the trailer to pivot with respect to the towing vehicle in all directions as necessary.

Obviously, as the trailer is connected with the towing vehicle at only a single point, considerable forces are often exerted on the hitch during movement of the vehicle and trailer. This is particularly true whenever the towing vehicle accelerates or deaccelerates, and also can occur when forces are exerted on the trailer in opposition to movement of the towing vehicle as, for example, where the wheels of the trailer come into contact with an obstruction such as a rock or the like. With such forces encountered, hitch failures have heretofore occurred.

If, however, the forces, or impact, could be reduced, or spaced over a larger time period, then hitch failures could be reduced, as could possible discomfort to the persons in the towing vehicle due to exertion of such forces.

SUMMARY OF THE INVENTION

This invention provides an improved hitch for a vehicle, said improved hitch providing means for at least partially absorbing forces exerted on the hitch. The hitch of this invention includes hitch mounting means movable relative to a frame with biasing means operatively connected to the hitch mounting means so that forces exerted in predetermined directions are at least partially absorbed by the hitch. Preferably, the hitch mounting means includes a pair of rods with springs mounted thereon at opposite sides of a stop plate to bias the hitch against movement in both axial directions of the rods of the hitch mounting means to thus better absorb exerted forces.

It is therefore an object of this invention to provide an improved hitch for vehicles.

It is another object of this invention to provide a force absorbing hitch.

It is yet another object of this invention to provide a force absorbing hitch capable of absorbing external forces exerted in at least one predetermined direction.

It is still another object of this invention to provide a force absorbing hitch capable of absorbing external forces exerted in opposite predetermined directions.

It is yet another object of this invention to provide a force absorbing hitch that includes a hitch mounting assembly having biasing means to at least partially absorb external forces exerted on the hitch.

It is still another object of this invention to provide a force absorbing hitch that includes a hitch mounting assembly having a pair of axially mountable rods biased against movement in opposite axial directions to absorb external forces exerted on the hitch.

It is yet another object of this invention to provide a force absorbing hitch mounted on an elongated frame at the rear of a vehicle.

With these and other objects in view, which will become apparent to one skilled in the art as the description proceeds, this invention resides in the novel construction, combination, and arrangement of parts substantially as hereinafter described, and more particularly defined by the appended claims, it being understood that such changes in the precise embodiment of the hereindisclosed invention are meant to be included as come within the scope of the claims.

BRIEF DESCRIPTION OF THE DRAWINGS

The accompanying drawings illustrate a complete embodiment of the invention according to the best mode so far devised for the practical application of the principles thereof, and in which.

DESCRIPTION OF THE INVENTION

Figure 1:
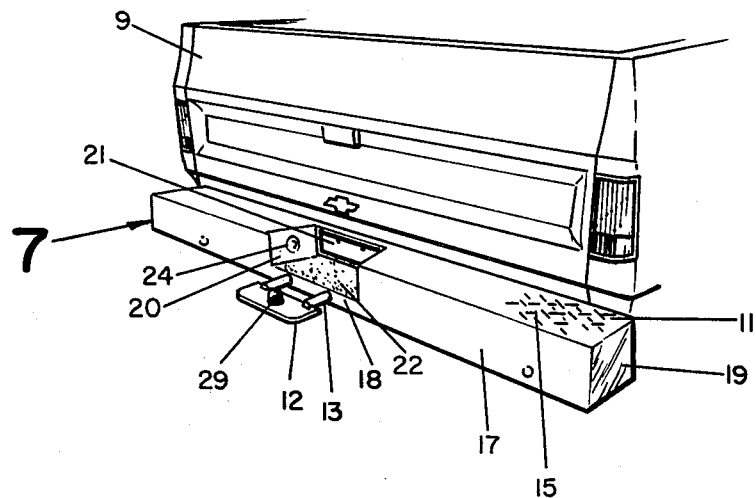
FIG. 1 is a perspective view of the improved hitch of this invention shown connected to the rear of a vehicle.
Figure 2:
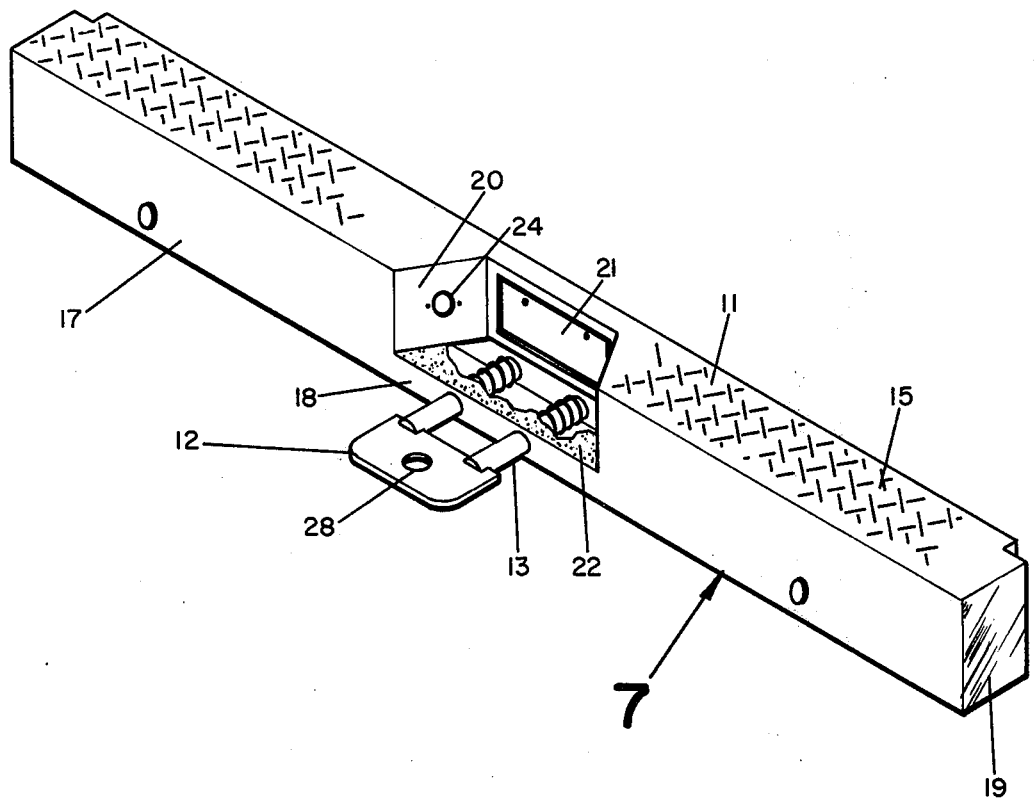
FIG. 2 is a top perspective view of the improved hitch of this invention with a portion broken away to better show the mounting assembly.

Referring now to the drawings, the improved hitch 7 of this invention as shown in FIG. 1 attached to a conventional towing vehicle 9, such as, for example, a truck or automobile.

As shown, the improved hitch 7 of this invention includes a frame 11 having hitch plate 12 mounted thereon by hitch mounting assembly 13.

Frame 11 is intended primarily to serve as a mount for the hitch and could therefore be of any suitable configuration as brought out hereinafter, including being a part of the vehicle itself.

Preferably, however, frame 11 is an elongated structure suitable for use as the rear bumper of the towing vehicle, or as an extension of the rear bumper. When so utilized, as shown in FIG. 1, frame 11 includes a horizontal top plate 15, which may consist of two principal sections where the center of the frame is recessed as shown in FIG. 1. If desired, horizontal top plate 15 may be roughened since the plate can serve as a rear step in conventional manner. In addition, a rear vertical wall, or plate, 17 depends from the rear edge of plate 15 and may also include two principal sections joined by a center section 18 when the center recess is provided. A bottom plate (not shown) and end plates 19 can also be utilized, and the frame can be conventionally mounted to the back of the rear bumper of a vehicle. Obviously, the frame 11 could also be otherwise attached to the rear portion of the vehicle, if desired.

The recess in frame 11 has depending side walls 20 and a depending front wall 21, which front wall extends below a horizontal recessed plate 22 (which may also be roughened). As indicated in FIG. 1, the width of the recess can be such as to allow a license plate or the like to be mounted on front wall 21 above recessed plate 22, and lights 24 may also be furnished in side walls 21.

Figure 3:
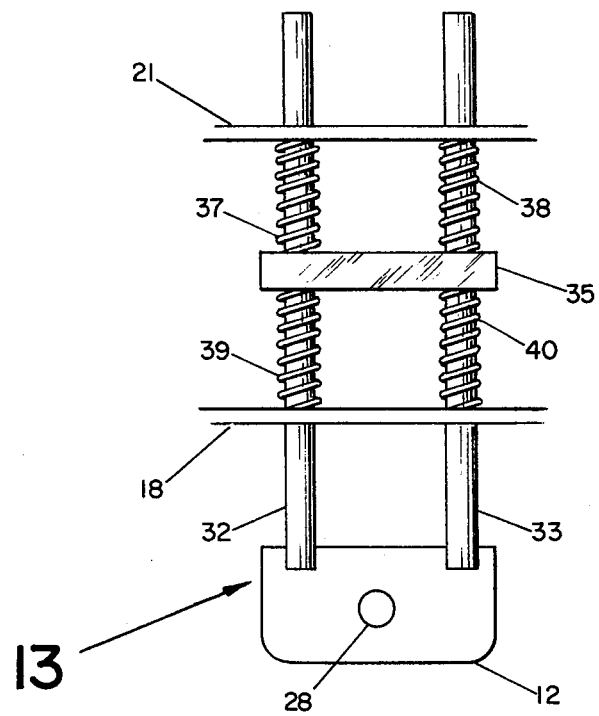
FIG. 3 is a top view of the hitch plate and mounting assembly as shown in FIGS. 1 and 2 but with the frame removed except for the spaced vertical walls.
Figure 4:
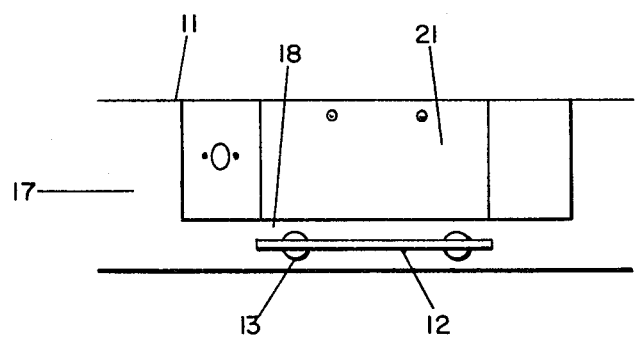
FIG. 4 is an end view of the improved hitch of this invention showing only a portion of the frame.

As shown best in FIG. 3, both front wall 21 and rear wall section 18 of wall 17 have means defining apertures therein, which apertures are horizontally spaced from one another in a line with an aperture in the other wall.

Hitch plate 12 is a flat rectangular plate having an aperture 28 therein for mounting of a hitch ball 29 or the like so that the hitch ball is upstanding and normal to the mounting assembly 13 which is mounted to the hitch plate at the front edge thereof and extends forwardly of the hitch plate.

Hitch mounting assembly 13 is best shown in FIG. 3 to include a pair of horizontally positioned and spaced rods 32 and 33 which extend through the apertures in rear wall 18 and front wall 21 of frame 11. Rods 32 and 33 are slideable within the apertures in the walls in opposite axial directions, i.e. forwardly and rearwardly, and, as shown, rods 32 and 33 extend beyond the front wall 21 a sufficient distance so that the rods will be retained within the apertures in the front wall despite rearwardly movement of the rods.

A stop plate 35 is fastened in conventional manner to rods 32 and 33 so that the stop plate is between the walls 18 and 21, as shown in FIG. 3. This stop plate limits movement of the rods in the opposite axial directions.

Springs 37, 38, 39 and 40 surround rods 32 and 33 with a spring on each rod at opposite sides of the stop plate with the springs being between the two walls 18 and 21. The springs are compression springs and bias the rods against movement in either axial direction.

In a working embodiment of the hitch of this invention, a frame was made of steel plates with plates 18 and 21 being spaced 6 inches from one another. Rods 32 and 33 were steel rods 1 inch in circumference and 9¼ inches long with steel stop plate 35 being fastened to the rod 6 ⅛ inches behind the end connected to hitch plate 12. Stop plate 35 was 5¾ × 1¾ × ¼ inches with the apertures being spaced 3½ inches center to center. Hitch plate 12 was 5 × 2⅞ × ¼ with the compression springs being either 3μ or 2 inches long and 1 1/16 inches ID and 1¾ inches OD. The invention, however, is not meant to be limited to the exact configuration which is set forth for illustrative purposes only.

In operation and after assembly of the hitch plate and hitch mounting assembly on the frame, a trailer or the like is conventionally fastened to the hitch. The hitch, due to its structure, will then at least partially absorb external forces tending to cause the towing vehicle and trailer to either converge or diverge, such as commonly occurs when the towing vehicle is accelerated or deaccelerated. When an external force is applied, the bias supplied by the springs will oppose the applied external force and this at least partially absorbs the force or impact. When the force is removed, the springs will then cause the hitch mounting assembly to assume its normal position with no springs under compression.

As can be seen from the foregoing, this invention provides an improved hitch for a vehicle having the ability to absorb applied external forces.

What is claimed is:

1. A force absorbing hitch for a vehicle, said hitch comprising:
   a hitch plate;
   frame means adapted to be connected to a vehicle, said frame means having a pair of spaced wall portions with each of said wall portions having means defining a pair of openings therein;
   plate mounting means connected to said hitch plate and having a pair of rods extending through said openings in said frame means so that said plate mounting means is movable with respect to said frame means in first and second predetermined opposite directions;
   limit means including stop means attached to said rods of said plate mounting means and positioned between said wall portions of said frame means to limit the movement of said plate mounting means in said first and second predetermined directions; and
   biasing means including spring means surrounding each of said rods with said spring means being positioned at both sides of said stop means of said limit means to bias said plate mounting means against movement in said first and second predetermined directions to at least partially absorb forces imposed upon said hitch in said predetermined directions.

2. The force absorbing hitch of claim 1 wherein said wall portions of said frame means includes a pair of elongated steel plates having said means defining said openings at the center portion thereof, and wherein said hitch plate has said plate mounting means fixed thereto at one edge portion and has a hitch ball mounting means spaced from said one edge portion so that a hitch ball when in place on said hitch extends upwardly from said hitch plate and normal to said plate mounting means with said hitch ball also being spaced from said elongated steel plates.

3. The force absorbing hitch of claim 1 wherein said pair of rods of said plate mounting means are positioned parallel to and spaced from one another, said means defining said pair of spaced openings defining aligned openings through which said rods extend.

4. The force absorbing hitch of claim 1 wherein said stop means of said limit means is a stop plate attached to said rods of said plate mounting means, and wherein said biasing means includes a pair of springs surrounding each of said rods urging said plate mounting means in said first and second predetermined directions.

5. A force absorbing hitch for a vehicle, said hitch comprising:
   a hitch plate;
   frame means adapted to be connected to a vehicle, said frame means having a pair of spaced substantially vertical wall portions with means in each of said wall portions defining a pair of apertures;
   plate mounting means connected to said hitch plate for mounting said hitch plate in a substantially horizontal position, said plate mounting means having a pair of substantially horizontal rods extending through said apertures in said wall portions of said frame means so that said rods are slideable in said apertures for movement in opposite axial directions;
   a stop plate connected to said rods at a point spaced from the connection of said plate mounting means to said hitch plate and between said vertical wall portions of said frame means; and
   biasing means surrounding said rods between said vertical wall portions of said frame means at both sides of said stop plate to bias said plate mounting means in said predetermined directions whereby forces imposed upon said hitch in said predetermined directions are at least partially absorbed.

6. The force absorbing hitch of claim 5 wherein said biasing means includes a pair of springs surrounding each of said rods with one of said springs being on one side of said stop plate and the other of said springs being on the other side of said stop plate with respect to each of said rods.

7. A force absorbing hitch for a vehicle, said hitch comprising:
- a substantially horizontal hitch plate having an aperture in one portion thereof to adapt said plate to receive an upwardly extending hitch ball;
- a frame adapted to be connected to the rear portion of a vehicle, said frame including front and rear spaced, substantially vertical walls each of which walls has a pair of horizontally spaced apertures therein with said apertures in said front wall being aligned with the apertures in said rear wall;
- a pair of substantially horizontal rods each of which is connected at the rear end to an edge portion of said hitch plate, said rods extending through said spaced apertures in said front and rear walls of said frame and terminating forwardly of said front wall;
- a stop plate connected to both of said rods between said front and rear walls of said frame; and
- first and second pairs of springs, said first pair of springs surrounding one of said rods with one of said springs being between said rear wall and said stop plate and the other of said springs being between said front wall and said stop plate, said second pair of springs surrounding the other of said rods with one of said springs being between said rear wall and said stop plate and the other of said springs being between said front wall and said stop plate.

* * * * *